United States Patent [19]

Murray et al.

[11] 4,424,498

[45] Jan. 3, 1984

[54] ADAPTIVE EQUALIZER

[75] Inventors: James A. Murray, Sawbridgeworth; David Nyman, New Barnet, both of England

[73] Assignee: International Standard Electric Corporation, New York, N.Y.

[21] Appl. No.: 325,446

[22] Filed: Nov. 27, 1981

[30] Foreign Application Priority Data

Dec. 18, 1980 [GB] United Kingdom ............... 8040502

[51] Int. Cl.³ .................. H04B 3/04; H03H 11/06
[52] U.S. Cl. .................... 333/18; 179/16 F; 179/170 R; 330/254; 330/282
[58] Field of Search ............ 333/18, 28 R; 179/1 D, 179/16 F, 170 R; 375/14; 330/254, 282

[56] References Cited

U.S. PATENT DOCUMENTS 3,568,100 3/1971 Tarbox .................. 333/28 R X
3,753,140 8/1973 Feistel .................. 333/28 R X Primary Examiner—Paul L. Gensler
Attorney, Agent, or Firm—John T. O'Halloran; Jeffrey P. Morris

[57] ABSTRACT

An adaptive equalizer for a twisted pair telephone line comprises a differential input/output amplifier, with the line connected to its positive input via a resistor and DC blocking capacitors. The junction of these capacitors is grounded via an adjustable impedance.

The amplifier has a feedback loop with another adjustable impedance also connected to the negative input of the amplifier.

Line impedance variations vary the impedance of both of the adjustable impedances, which, include diodes to separately compensate for the line's attenuation and frequency characteristics.

2 Claims, 3 Drawing Figures

ADAPTIVE EQUALIZER

BACKGROUND OF THE INVENTION

1. Field of the Invention

This invention relates to an adaptive equalizer for use with telephone lines, especially where the lines use twisted pair cables.

2. Description of the Prior Art

Telephone lines are of varying length and thus of different impedances with the result that it is necessary at a receiving point to adjust for the varying impedances of the line. One known method of achieving this is shown in FIG. 1. Here automatic line build out circuits 1 are used, which are controlled by devices which sense the level of the received signal and adjust the impedance of the build out circuits accordingly. Thus the input 2 from the line is applied via the build out circuits 1 to a differential amplifier 3 whose output 4 is at a substantially fixed level irrespective of line impedance.

This uses a peak detector 5 connected to the output of the amplifier 3, controlled by a fixed threshold applied at 5, and in turn controlling a current pump circuit 6. When the line is short, input signal level is at a maximum, and large currents are pumped by the pump 6 into the diodes 7, 8, 9. These diodes are effectively variable impedance devices whose impedance is minimum when the current flowing through them is maximum. Thus for short lines the line build out components in the block 1 are fully in circuit, giving the effect that the system operates under maximum line conditions. As the length of the line increases and the signal level decreases, the impedances of the diodes increase, and the build out elements become less dominant. If the loss of effectiveness of the build out circuits is matched to the variations in line length, then the amplifier input effectively sees identical or almost identical signals under all line conditions.

One problem with such a circuit is that the line build out circuit has to match both the attenuation and frequency characteristics of the line, and as the elements are cascaded one effects the other, complicating the design. An object of the invention is to minimize or even overcome this problem.

SUMMARY OF THE INVENTION

According to the present invention there is provided an adaptive equalizer for use with a telephone line, which includes a differential input/output amplifier to one input of which the line is connected when the equalizer is in use, a feedback loop connected from one output of the amplifier to the other input thereof, the loop interconnecting an output of one polarity and an input of the other polarity, a first adjustable impedance connected to said other input, and a second adjustable impedance connected to said one input of the amplifier, said adjustable impedances being automatically adjusted in accordance with line conditions so that differences in line characteristics are compensated.

DESCRIPTION OF THE PREFERRED EMBODIMENT

Figure 2:
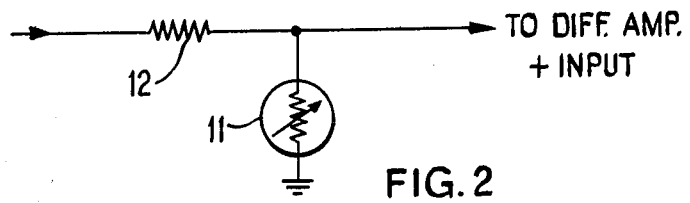
FIG. 2 illustrates an automatic line build out diode.

An embodiment of the invention will now be described with reference to FIG. 2, which is an explanatory diagram and FIG. 3, which is a circuit using the invention.

The basis of the circuit to be described is that the attenuation compensation is separated from the frequency compensation, which enables the design to be simplified and the number of components reduced to provide equivalent, or even better, performance. The main component of the circuit is a differential input/output amplifier 10, FIG. 3. The open loop gain of the circuit should be fixed and constant over the desired spectrum. Attenuation is achieved by using one of the automatic line build out diodes 11, FIG. 2, in conjunction with a series resistor 12 as a potential divider. This ensures that there is no reactive component to the line build out attenuation.

Figure 3:
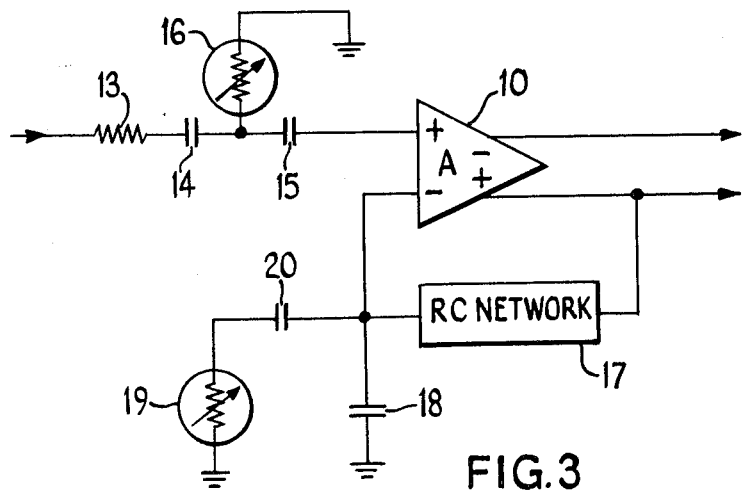
FIG. 3 is a preferred embodiment of an equalizer in accordance with the present invention.

In the circuit shown in FIG. 3, the line is connected via a resistor 13, and capacitors 14 and 15 to the positive input of the amplifier 10. The junction between the two capacitors is grounded via a first build out diode 16, which thus acts as an adjustable impedance to compensate for line attenuation rate variation.

The feedback path of the amplifier incorporates an RC network 17, which has a low pass response: this in conjunction with a capacitor 18 has a low pass frequency response which matches the worst case line conditions that the circuit has to meet. This would normally occur with the longest line with maximum attenuation. Thus the impedance of the diode 19 is high so it has negligible effect on the reactance of the capacitor 18. As the line attenuation is reduced, the resistance of the diode 19 is also reduced and begins to dominate the reactance of capacitor 18. Ultimately on short lines almost no feedback would exist via the RC network, allowing the amplifier to operate under its fixed maximum gain conditions.

It would be possible to have a cascade of RC components in the feedback path, where each capacitor is controlled by a diode, as for 18-19. However, in practice on local area twisted pair cables with digital transmission rates between 80 Kbit/s and 256 Kbit/s it was found that only one diode such as 19 was needed on the feedback path.

The capacitors 14, 15 and 20 have high values and are used for DC blocking to avoid upsetting amplifier bias.

Figure 1:
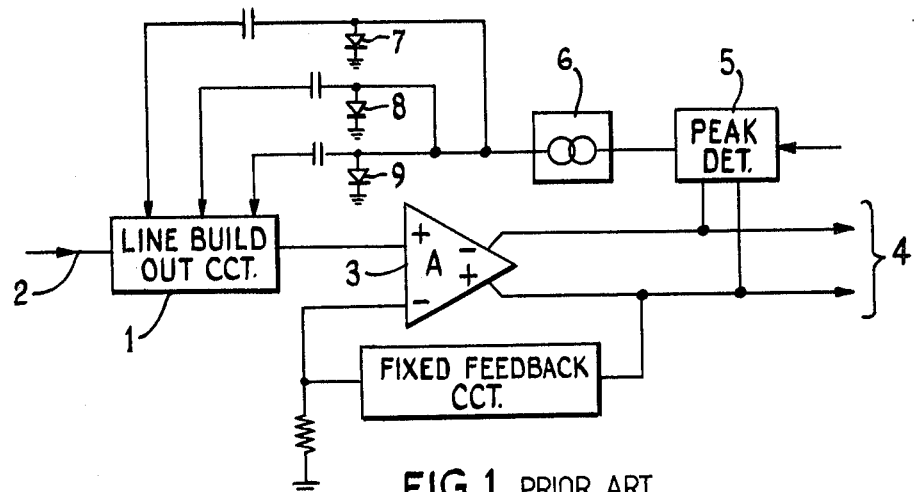
FIG. 1 is a prior art equalizer circuit.

The means for controlling the variable attenuator formed by the potential divider arrangement of resistor 13 and diode 16, and for that matter the other variable impedance diodes are not shown since conventional components may be used. In the present arrangement this control is exercised by varying the currents which flow in those components using transistor circuits. In such circuits the peak signal level is compared with a threshold voltage $V_{TH}$ applied to the peak detector 5, FIG. 1. The differential voltage between the peak signal level and the threshold voltage $V_{TH}$ is amplified and integrated to control a transistor current source amplifier, represented by the current pump 6, which thus controls the current through the diodes 7, 8, 9. This has the desired effect of controlling the diode impedances.

We claim:

1. An adaptive equalizer for use with a telephone line, comprising:

differential amplifier means having a fixed internal gain to one input of which the line is connected when the equalizer is in use;

feedback loop means connected from one output of the amplifier to the other input thereof, said loop interconnecting an output of one polarity and an input of the other polarity; and first adjustable impedance means connected to one input of the amplifier and second adjustable impedance means connected to the other input of the amplifier, whereby the first adjustable impedance is automatically adjusted in accordance with line conditions to compensate for variations in line attenuation, and whereby the second adjustable impedance is automatically adjusted to compensate for variations in the frequency characteristics of the line, and wherein each adjustable impedance means includes a diode having an impedance which is variable in accordance with the current flowing therethrough.

2. An adaptive equalizer in accordance with claim 1 wherein said telephone line is a twisted pair line.

* * * * *